(12) United States Patent
Resendez

(10) Patent No.: US 7,997,646 B2
(45) Date of Patent: Aug. 16, 2011

(54) SELF-FASTENING HEADREST COVER

(76) Inventor: Raul Resendez, San Antonio, TX (US)

( * ) Notice: Subject to any disclaimer, the term of this patent is extended or adjusted under 35 U.S.C. 154(b) by 0 days.

(21) Appl. No.: 12/791,721

(22) Filed: Jun. 1, 2010

(65) Prior Publication Data

US 2011/0133526 A1      Jun. 9, 2011

Related U.S. Application Data

(63) Continuation of application No. 11/728,178, filed on Mar. 23, 2007, now Pat. No. 7,726,735.

(51) Int. Cl.
*A47C 31/00* (2006.01)
(52) U.S. Cl. ............... 297/220; 297/224; 297/228.11
(58) Field of Classification Search ............ 297/219.1, 297/220, 224, 227, 228.11, 228.12, 229, 297/397; 5/494, 496, 497, 498
See application file for complete search history.

(56) References Cited

U.S. PATENT DOCUMENTS

| | | | |
|---|---|---|---|
| 1,646,792 A | 10/1927 | Moore | |
| 2,048,097 A | 7/1936 | Bjornson | |
| 2,227,180 A | 12/1940 | Falk | |
| 2,497,698 A | 2/1950 | Struble et al. | |
| 2,817,391 A | 12/1957 | Zacks | |
| 3,318,632 A | 5/1967 | Struble et al. | |
| 3,578,383 A * | 5/1971 | Earl | 297/391 |
| 3,635,523 A | 1/1972 | Alpert | |
| 3,654,059 A | 4/1972 | Zisblatt | |
| 4,056,281 A | 11/1977 | Byrnes | |
| 4,396,227 A | 8/1983 | Neilson | |
| 4,693,511 A | 9/1987 | Seltzer et al. | |
| 4,824,168 A | 4/1989 | Makoski | |
| 4,844,540 A | 7/1989 | Pegram | |
| D312,019 S | 11/1990 | Woods et al. | |
| 5,015,036 A * | 5/1991 | Fergie | 297/397 |
| 5,234,252 A | 8/1993 | Wallach | |
| 5,503,456 A | 4/1996 | Rossini | |
| 5,529,373 A | 6/1996 | Olson et al. | |
| 5,707,107 A | 1/1998 | Melone | |
| 5,768,758 A | 6/1998 | Deignan et al. | |
| 5,803,539 A | 9/1998 | Dewar et al. | |
| 5,816,654 A | 10/1998 | Ellis | |
| D405,637 S | 2/1999 | Licata et al. | |
| 5,957,528 A | 9/1999 | Campbell | |
| 5,975,638 A | 11/1999 | Schreiner | |
| 6,312,051 B1 | 11/2001 | Adams | |
| 6,345,866 B1 | 2/2002 | Jackson et al. | |
| 6,588,840 B1 | 7/2003 | Lombardo | |
| 6,648,410 B2 | 11/2003 | Sparks | |
| 6,655,736 B1 | 12/2003 | Arenas | |
| 6,655,737 B2 | 12/2003 | Hyduk | |
| D492,154 S | 6/2004 | Martial | |

(Continued)

FOREIGN PATENT DOCUMENTS

JP       2002330845      11/2002

*Primary Examiner* — Peter R. Brown
(74) *Attorney, Agent, or Firm* — Kammer Browning PLLC

(57) ABSTRACT

A removable headrest cover for a seat is described having improved features for securing and attaching the cover to a headrest. The improved features include integrated elastic elements that serve to secure the cover to a headrest, eliminating the need for engaging receptacles on the seat. The positioning and placement of attachment points for the elastic provide versatility to the headrest cover that allows it to be used with many different seat configurations. Methods for efficiently manufacturing and packaging the cover are also described.

16 Claims, 11 Drawing Sheets

U.S. PATENT DOCUMENTS

| | | |
|---|---|---|
| 6,827,398 B2 | 12/2004 | Nazginov |
| 6,948,771 B1 | 9/2005 | Salandy |
| 6,959,963 B2 | 11/2005 | Hunter et al. |
| 7,000,984 B1 | 2/2006 | Ward |
| 7,168,760 B2 | 1/2007 | Kenny |
| 7,240,964 B2 | 7/2007 | Riley |
| 7,337,480 B2 | 3/2008 | Borino |
| 7,419,213 B2 | 9/2008 | Itakura |
| 2002/0096919 A1 | 7/2002 | Sparks |
| 2003/0006634 A1 | 1/2003 | Hyduk |
| 2003/0015899 A1 | 1/2003 | Clay |
| 2004/0026966 A1 | 2/2004 | Albersen |
| 2006/0076810 A1 | 4/2006 | Nichols |
| 2007/0040426 A1 | 2/2007 | Kenny |
| 2009/0039689 A1 | 2/2009 | Smith |

* cited by examiner

FIG. 1-A
FIG. 1-B
FIG. 1-C
FIG. 1-D
FIG. 1-E
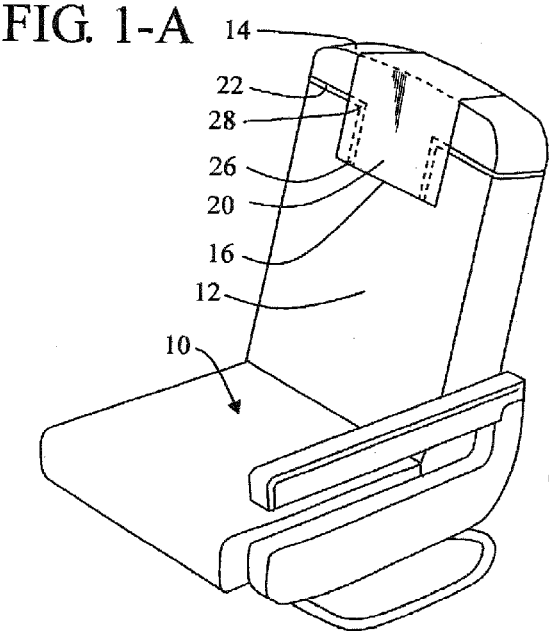
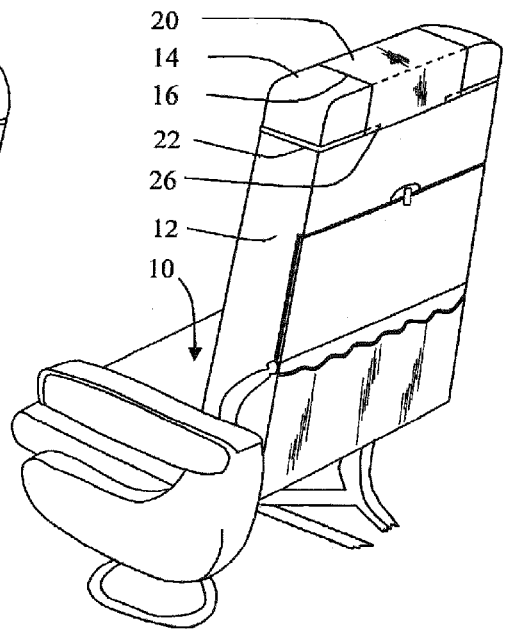
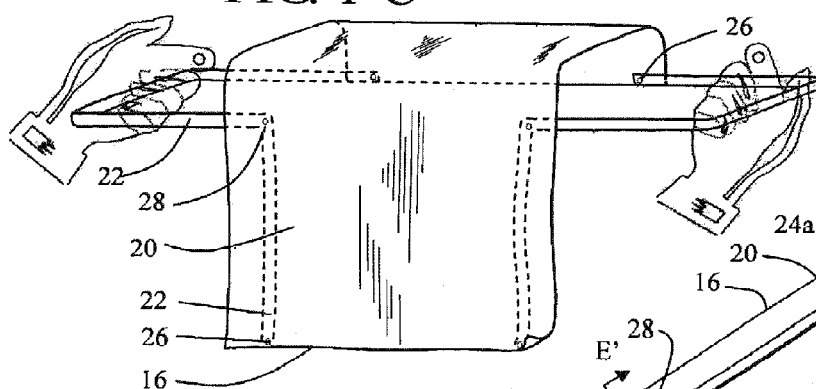
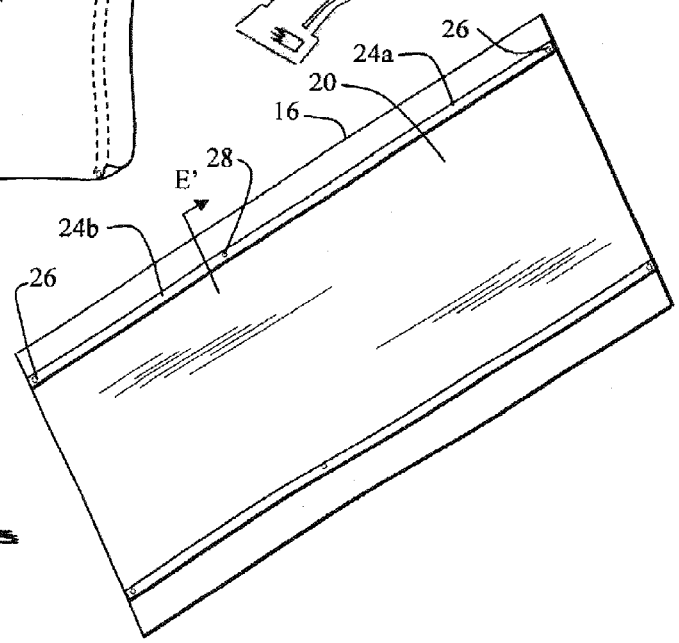
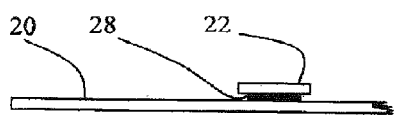

FIG. 2-A
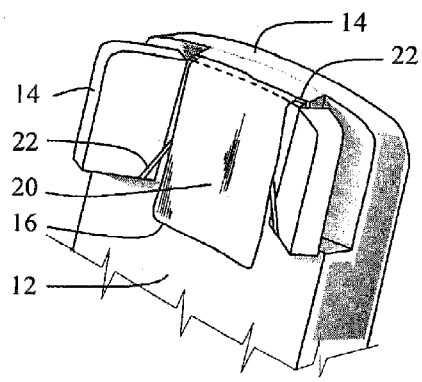
FIG. 2-B
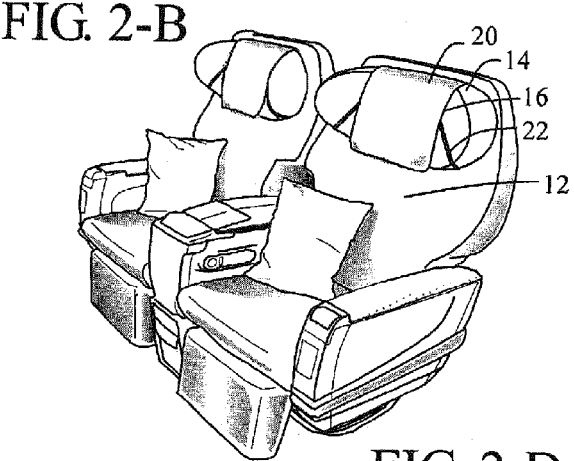
FIG. 2-C
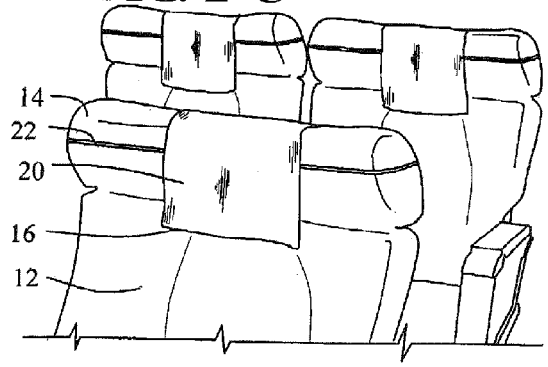
FIG. 2-D
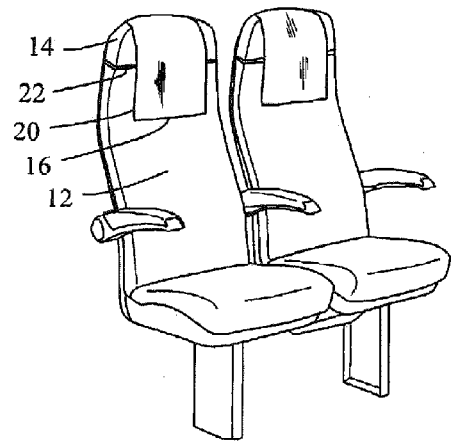
FIG. 2-E
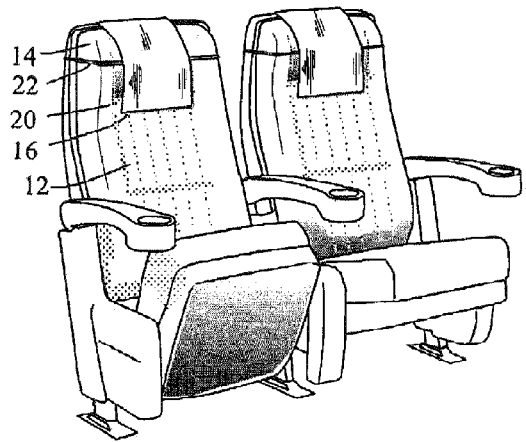
FIG. 2-F
FIG. 2-G
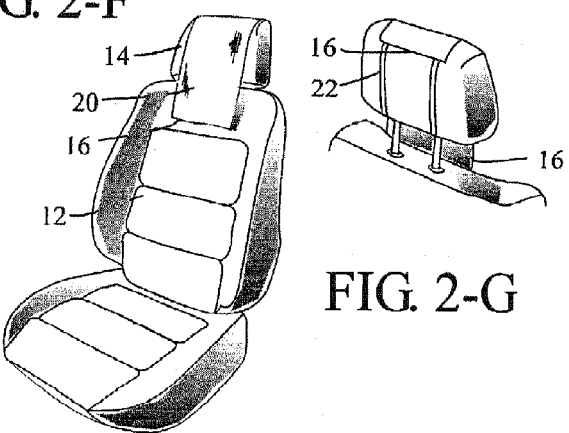

FIG. 3-A
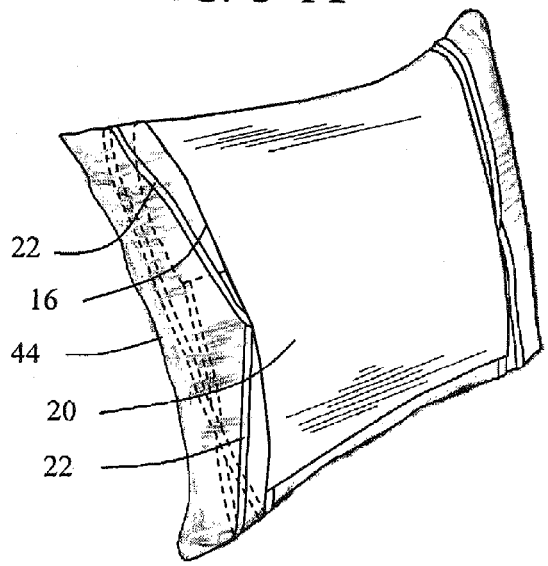
FIG. 3-B
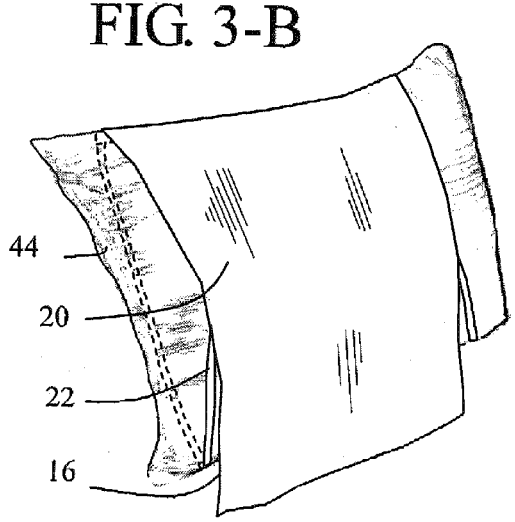
FIG. 3-C
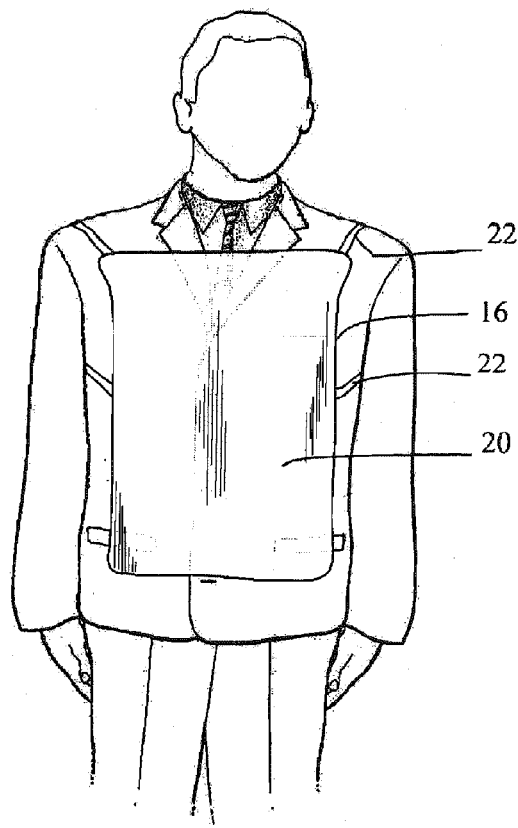
FIG. 3-D
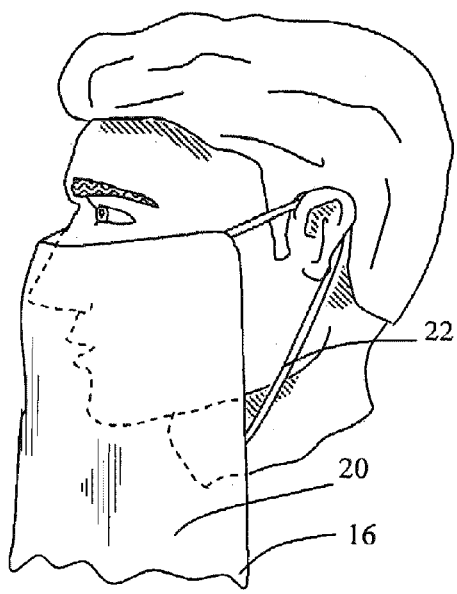

FIG. 4-A
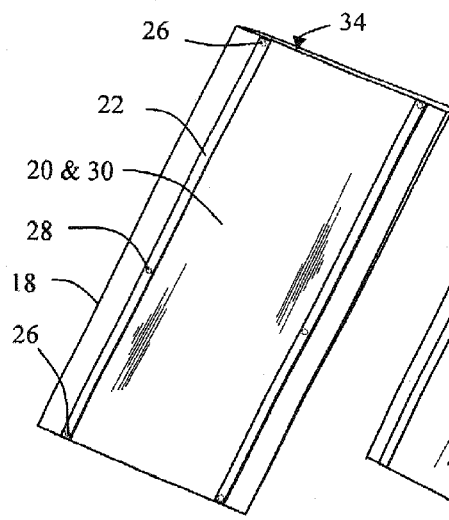
FIG. 4-B
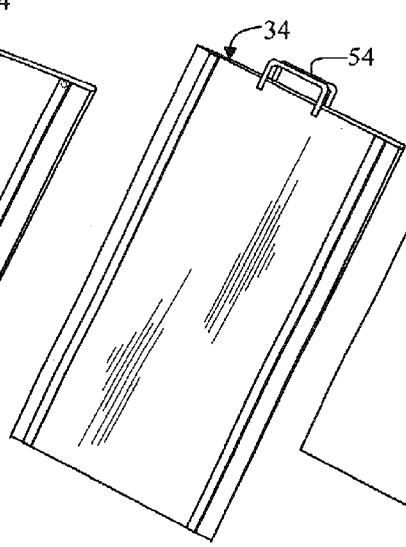
FIG. 4-C
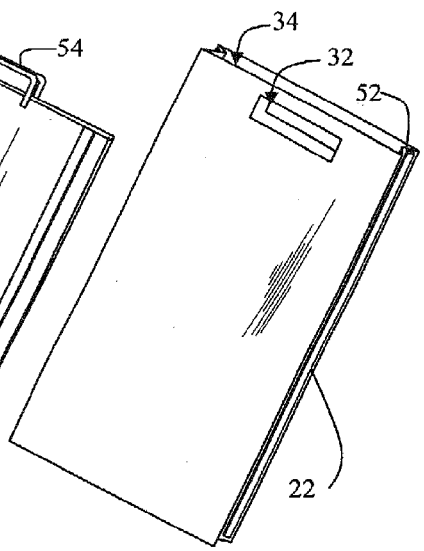
FIG. 4-D
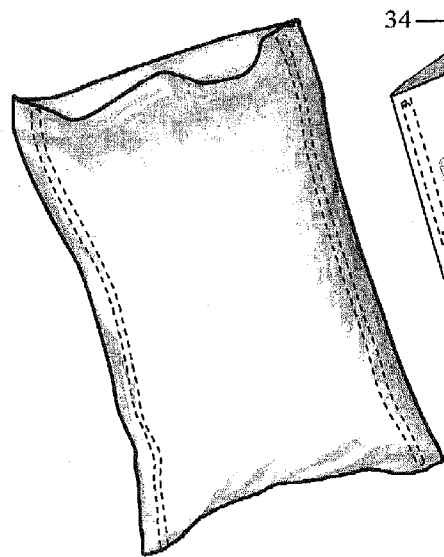
FIG. 4-E   FIG. 4-F
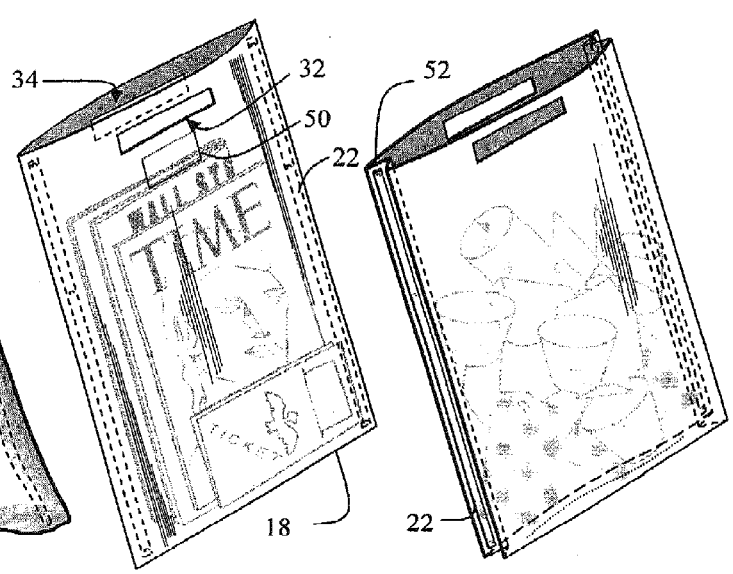

FIG. 5-A
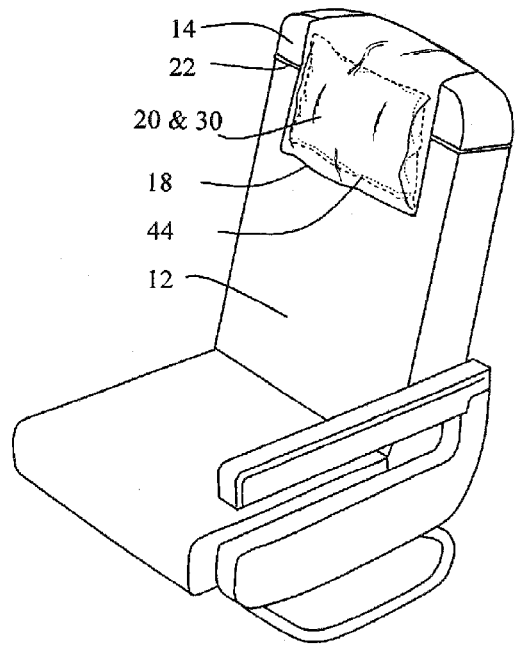
FIG. 5-B
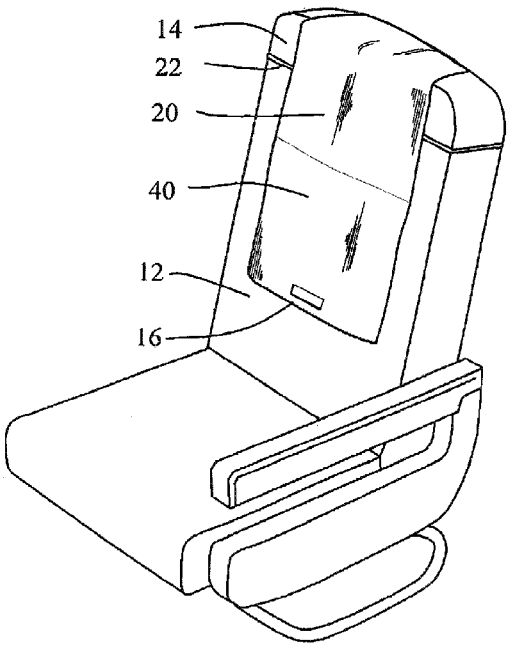
FIG. 5-C
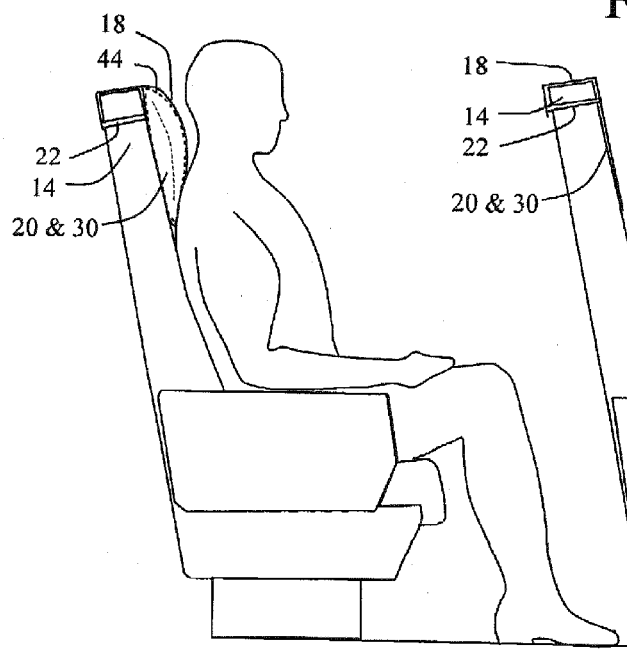
FIG. 5-D
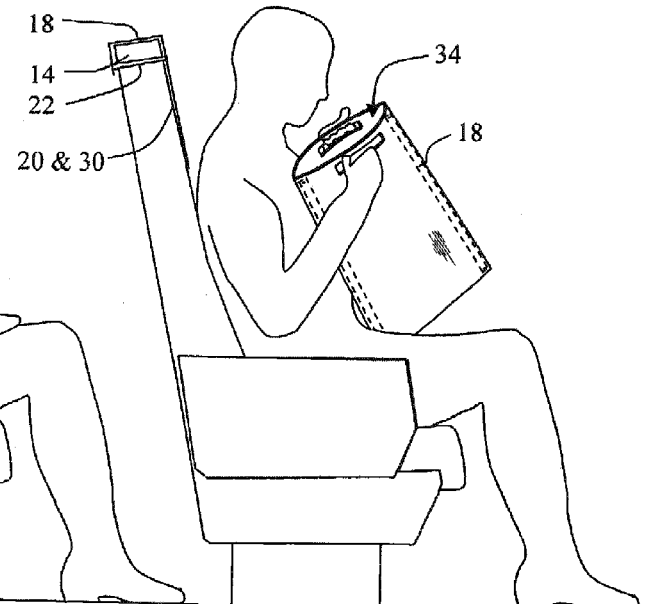

FIG. 6-A
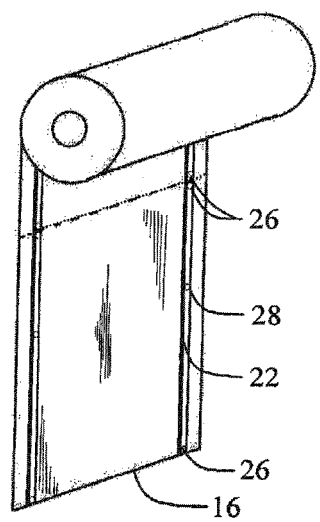
FIG. 6-B
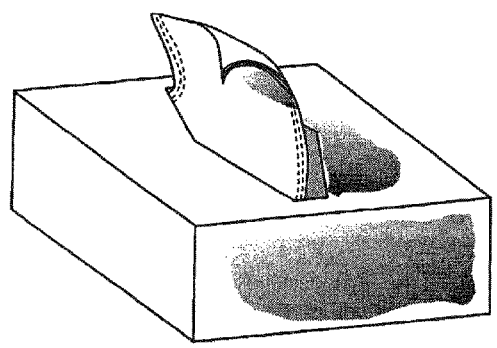
FIG. 6-C
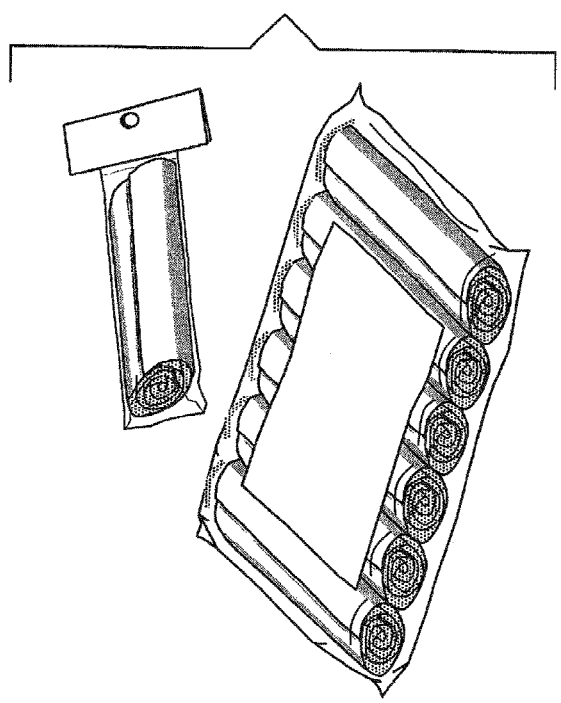
FIG. 6-D
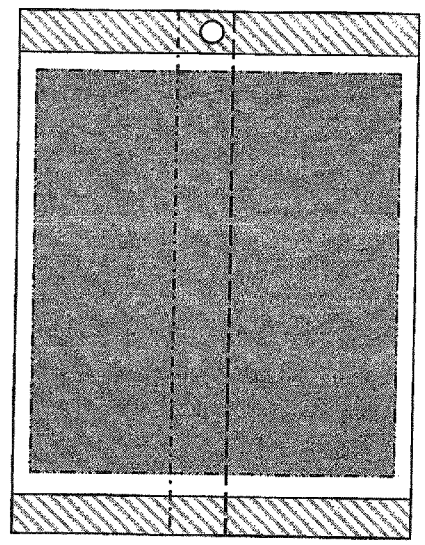

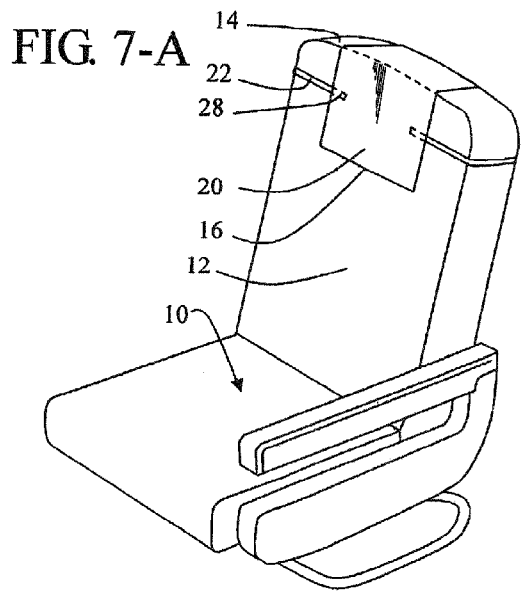
FIG. 7-A
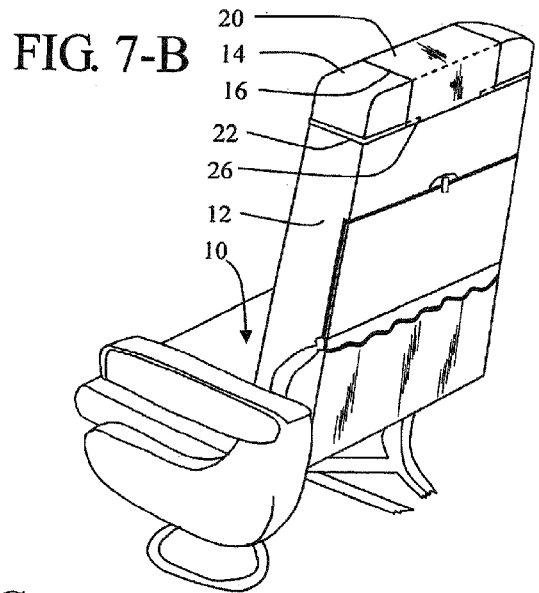
FIG. 7-B
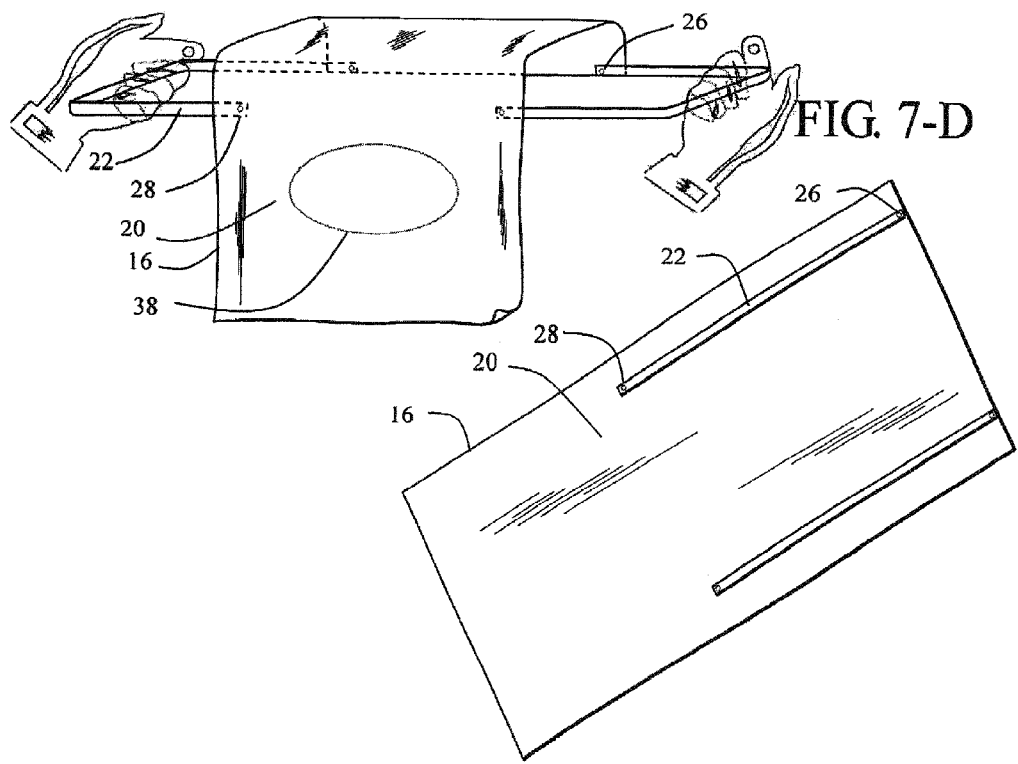
FIG. 7-C
FIG. 7-D

FIG. 8-A
FIG. 8-B
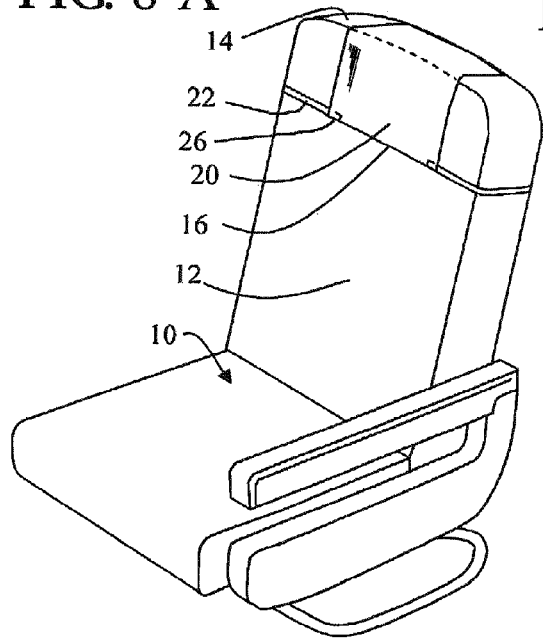
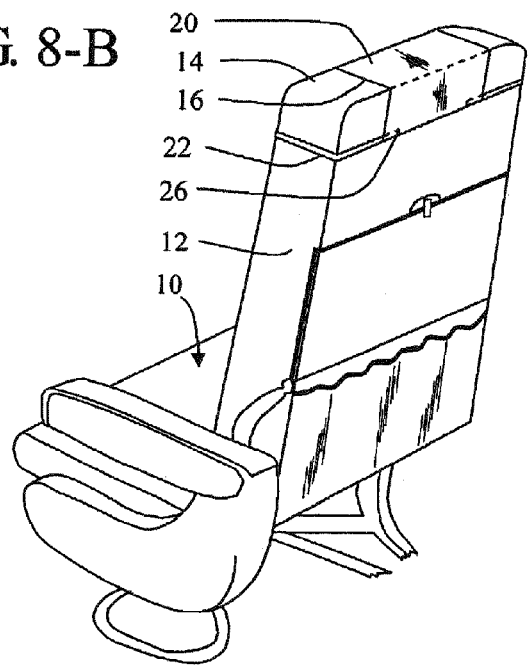
FIG. 8-C
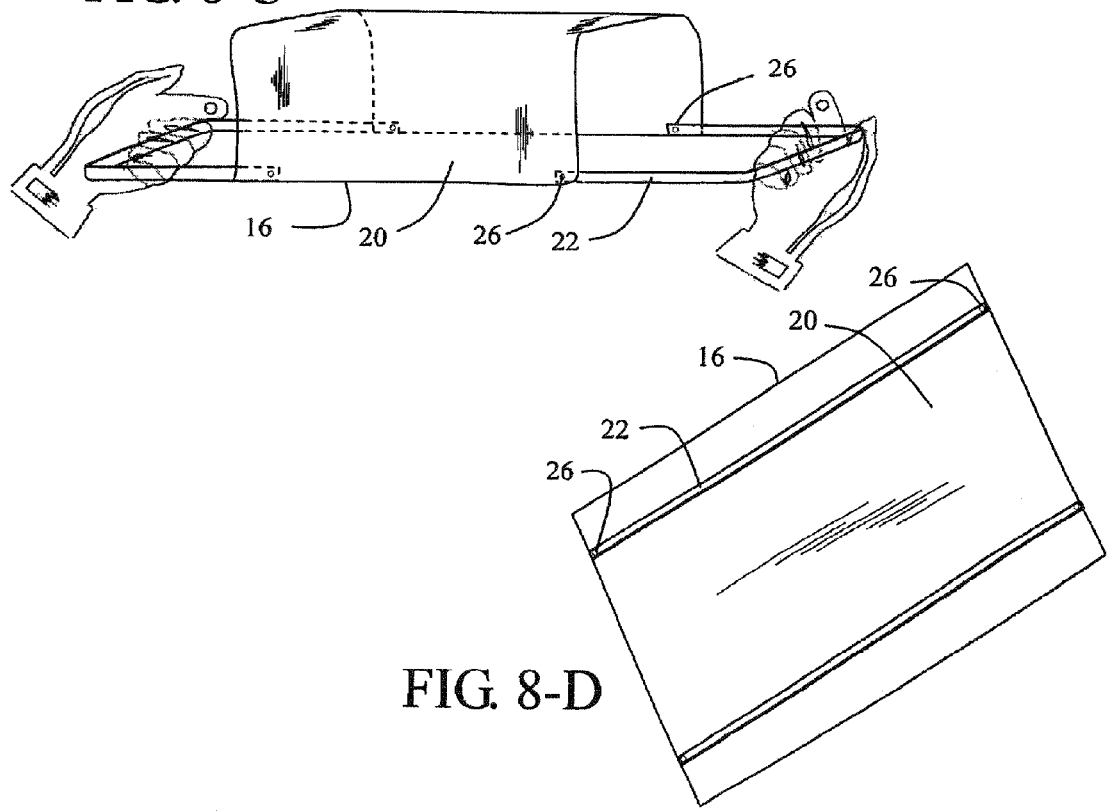
FIG. 8-D

FIG. 9-A
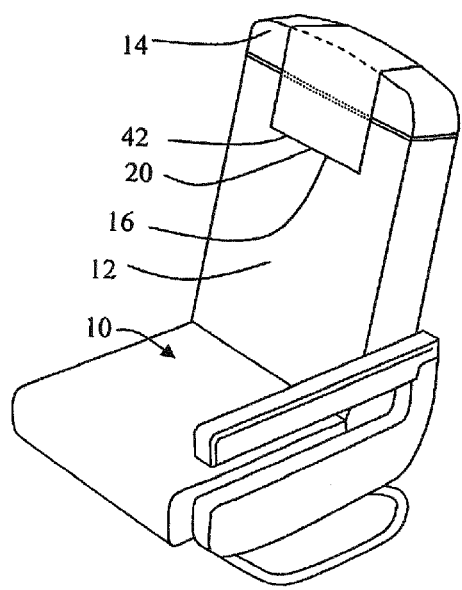
FIG. 9-B
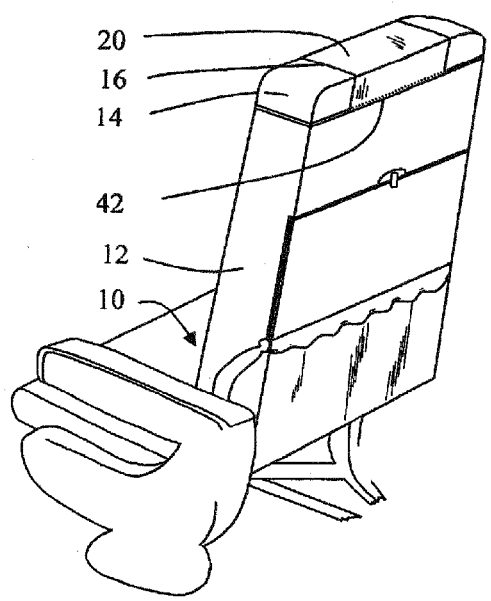
FIG. 9-C
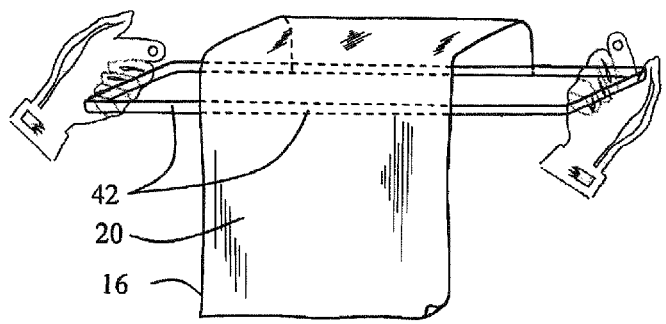
FIG. 9-D
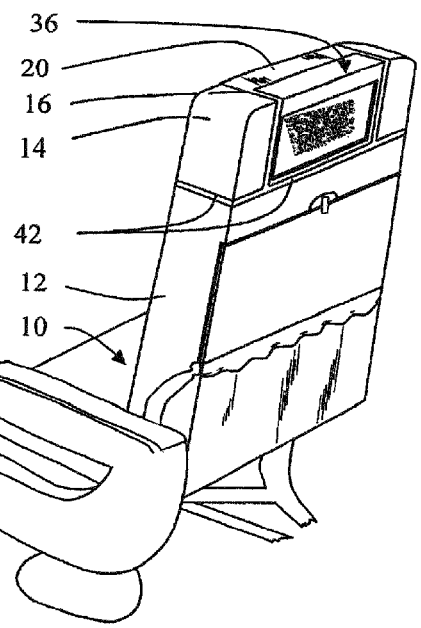
FIG. 9-E
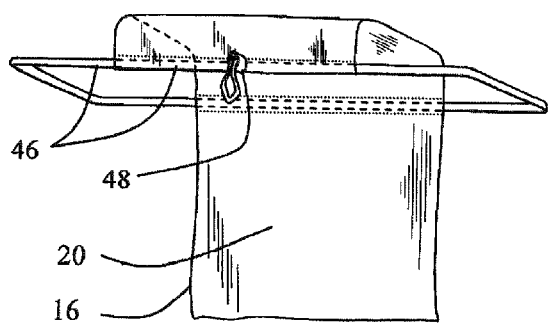

FIG. 10-A
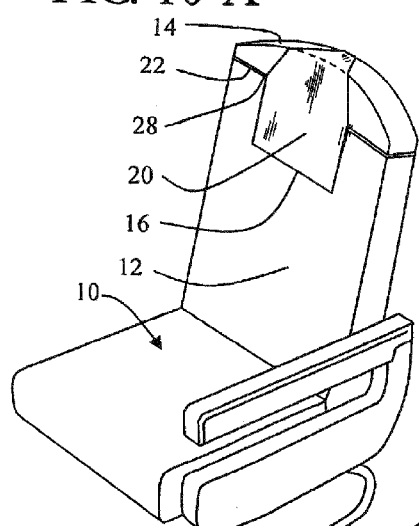
FIG. 10-B
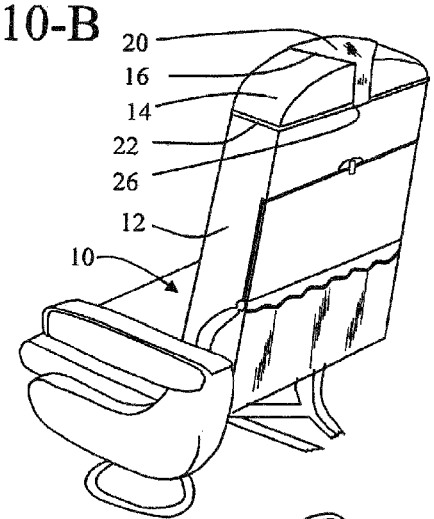
FIG. 10-C
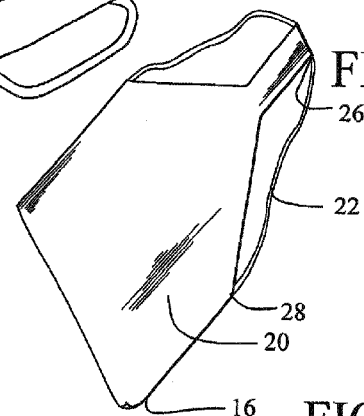
FIG. 10-D
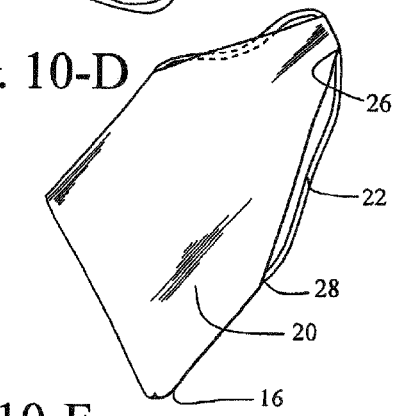
FIG. 10-E
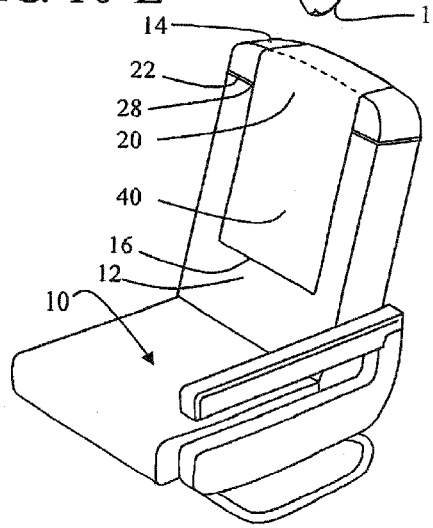
FIG. 10-F
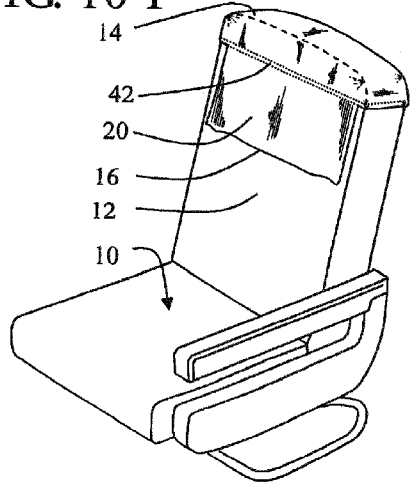

FIG. 11-A
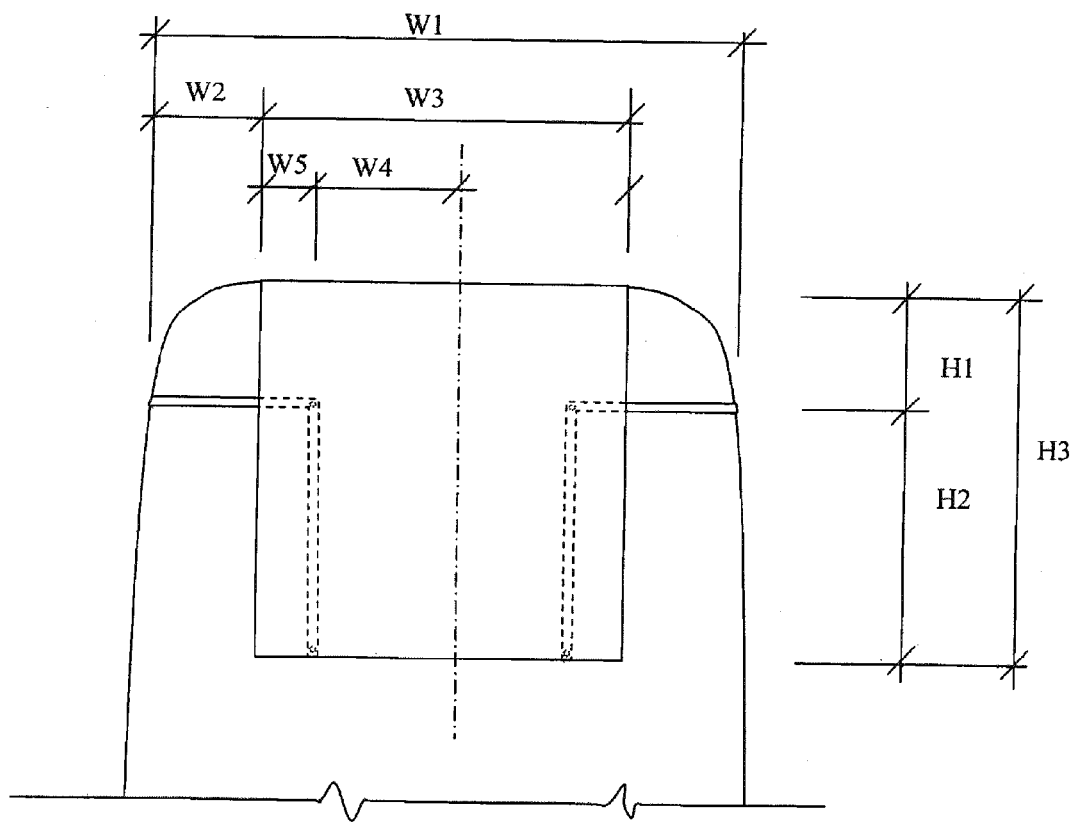
FIG. 11-B
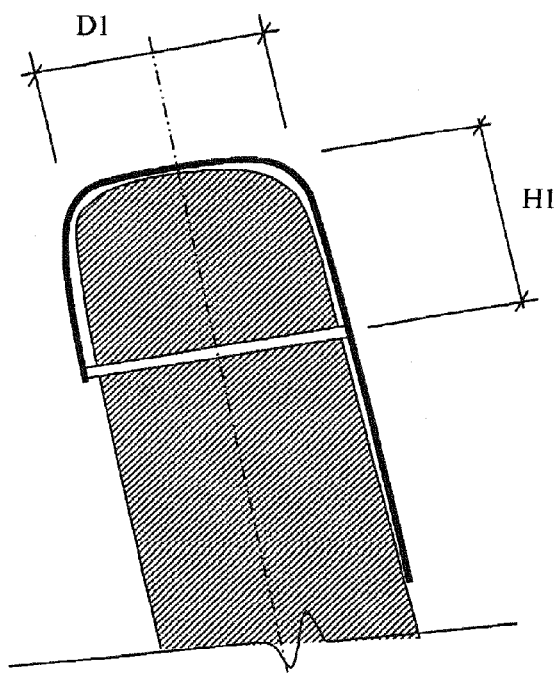

SELF-FASTENING HEADREST COVER

CROSS REFERENCE TO RELATED APPLICATIONS

This Application claims the benefit under Title 35 United States Code §120 as a Continuation of co-pending U.S. patent application Ser. No. 11/728,178 filed Mar. 23, 2007 which itself further claims the benefit under Title 35 United States Code §119(e) of U.S. Provisional Patent Application Ser. No. 60/743,679, filed Mar. 23, 2006, the full disclosures of which are incorporated herein by reference.

BACKGROUND OF THE INVENTION

1. Field of the Invention

The present invention relates generally to improvements in replaceable seat headrest covers. The present invention relates more specifically to the means for attaching headrest covers to seats as well as the manufacturing processes for the headrest covers. The invention resides in the construction, combination, and arrangement of parts as well as the methods of manufacture.

2. Description of the Related Art

For the purpose of illustration, most references made herein are to the use of headrest covers on airline carriers and cinema theaters, but the invention applies to all forms of transportation, public conveyances, and facilities in both commercial and residential settings; i.e.: buses, trains, boats, automobiles, medical/dental facilities, entertainment venues, offices, homes and the likes. The present invention finds utility anywhere an individual might find it necessary to use a seat that has been previously occupied by other individuals.

Ever since the introduction of the headrest portion of a seat on transportation vehicle seats, and more recently on cinema theaters, the issue of the headrest becoming soiled and potentially contaminated by constant contact with multiple occupants has been a latent concern to respective industries, health agencies, and the informed general public. This issue of concern is especially acute on long transit transportation vehicles and cinema theaters where the seat occupants constantly rub their scalps against the headrest while assuming a more relaxed position. Such continuous contact with the headrest results in it quickly becoming soiled, creating a potentially unsanitary surface, which may act as a conduit to transfer contaminants to subsequent occupants.

High traffic surfaces harbor microorganisms that can contaminate a multitude of people. The present invention is designed not only to prevent possible soiling of the head-rest portion of the seat, but also the possibility of transmission of scalp, skin, parasitic and other diseases from any of the many previous users of the seat to another user. This possibility of transmission increases due to the fact that most people, in many high traffic and crowded settings, use the headrest portion of seats, as handle bars. They are used as leverage to get in, out and up from seats, as balancing tools while moving down the isle or simply as a place to set ones hands while standing, chatting, or waiting to disembark.

Throughout the useful life of commercial airplanes and cinema theaters, seats can often be occupied by thousands of different individuals of various degrees of cleanliness and health conditions before seats are ever cleaned, replaced, or reupholstered. Some seats may even go years before being properly cleaned. In many cases, the cleaning process might not sufficiently sanitize the headrest. Most health agencies cite international travel as a major factor in the global spread of contagious diseases. If headrest surfaces are not consistently cleaned after each occupant, the seats can potentially expose a multitude of future occupants to serious health hazards which could later be transferred and spread across entire communities.

Upholstered headrests can hide the tiny gray-white head lice eggs called nits. Head lice can live up to two to three days apart from the body, on a seat headrest. Head lice are remarkably prolific and can spread and flourish even among so-called hygiene conscious communities. In the U.S. alone, as many as twelve million people could be host to head lice at any given time. Unless provisions are made to continuously provide the public and travelers with sanitized headrest surfaces, the potential for the rapid spread of infectious, communicable, contagious, and parasitic diseases is greatly increased. A separate, but closely applicable concern is the realistic threat of a terrorist act, i.e.; applying chemical type substances to seat surfaces which are in direct contact with a passenger's skin. Most chemicals are readily absorbed through the skin and in many cases skin is a more significant route of exposure than the lungs.

Presently, the most common method to reduce soiling and contamination on public seats is with the use of replaceable headrest covers. Unfortunately, the sporadic and inconsistent manner in which such covers are presently used does little in preventing the contamination of public seats and consequently that of their occupants. The general public, although not yet publicly expressing concern likely soon will, as they become aware of the imminent risk of using public seats without protective covers. Without public expressions of concern, applicable industries and agencies may downplay the risk, placing priority on economic efficiency over the safety of seat occupants. Individual, cost effective, solutions to the problem will therefore become very important.

Resting ones head on the headrest of an unprotected public seat could be the equivalent of resting ones head on a hotel pillow that has been used by multiple individuals, without changing the pillow casing. No one well informed of the potential risk and consequences would willingly rub their head against a stranger's scalp, much less with that of the hundreds of individuals with different degrees of hygiene and unknown health conditions that have used the seat before them. For these reasons alone, it might be concluded that in an effort to reduce or control the effects of a potential pandemic, public conveyances and entertainment venues might appropriately be required to provide sanitized covers after each leg of travel and prior to every show-time, respectively. If such a mandate were to be imposed today, many public carriers would be under prepared to comply with such a directive. Many transportation carriers would not be able to absorb the time and financial burden required in complying with such a legal requirement, and those industries that did, would likely pass the incremental cost directly on to the customers.

The airline industry and other agencies have long sought alternative means for efficiently addressing said problems without imposing further stress on an industry already under severe economic pressures. One reason airlines do not provide protective covers to passengers is the fact that most, if not all presently available headrest covers, are too costly to provide. They require extensive handling and are considered invasive to the seat, often requiring attachment elements to be previously and permanently embedded onto the seats.

Some earlier methods of attaching replaceable covers to the headrest included elaborate mechanisms as shown in U.S. Pat. No. 3,063,749 issued to Struble (1962) and even required special tools as shown in U.S. Pat. No. 3,113,803 also issued to Struble (1963). The need for a special tool to attach the cover to the headrest, and the requirement of having to permanently embed the receiving engagement element onto a seat, turns the method of attachment into an inefficient, inconvenient, and expensive alternative.

Another unpopular method to engage replaceable covers to a seat headrest is with the use of adhesive strips. See U.S. Pat. No. 3,654,059 issued to Zisblatt (1972) and U.S. Pat. No. 3,635,523 issued to Alpert (1972) as examples. An inherent problem with such methods of attachment is the build-up of adhesive residue on the headrest, which creates a sanitary hazard in itself. Separate from the hygiene concern, certain materials used in the construction of seats do not lend to adequately hold adhesive strips. Any method requiring repetitive application of adhesive substances on the seat's surface, especially to the area where occupants usually rests their heads, is not one that can be widely embraced by any industry or health agencies.

Several other improvements have been made to headrest covers over the years and in particular to the means for attaching the cover to the seat, but most suffer similar drawbacks; the need for special receiving engagement elements on the seat in order for the removable headrest cover to be held in place. See U.S. Pat. No. 3,266,841 issued to Altman (1966); U.S. Pat. No. 3,318,632 issued to Struble (1967); U.S. Pat. No. 3,804,458 issued to Jannoni (1974); U.S. Pat. No. 4,056,281 issued to Byrnes (1977); U.S. Pat. No. 4,067,609 issued to Ness (1978); and U.S. Pat. No. 4,069,781 issued to Andersson (1978) as further examples of previous efforts in the field.

For the above stated reasons, the use of such hook-and-loop and adhesive engagement devices and reusable covers is dramatically declining and even discontinued, as the handling process for the covers and specific requirement of embedding engagement elements onto the seat results in it being a costly alternative. In addition, the engagement elements permanently embedded onto the seats can degrade the seat's appearance and become cause for hygiene concern themselves. An even more deterrent factor materializes with the use of presently available reusable headrest covers. The reusable versions of headrest covers are primarily made of cloth, leather, or towel like material. These types of materials and reusable fastening elements are expensive to purchase and their loss by unauthorized removal and mishandling adds to the operating cost. The laundering of such covers is an expensive operation, requiring additional handling for packaging and transporting it to and from the processing locations. The life time replacement cycle for reusable covers would primarily depend on how often they are cleaned, as the laundering process deteriorates the fabric, its texture, and its colors. Unless a fresh cover is provided for each individual passenger, the frequency in which covers are currently utilized does little to fulfill the object of providing hygiene protection for passengers. In many cases, when airlines provide headrest covers on seats and are not regularly changed, it is primarily because its use is intended to protect the seat fabric and not necessarily the passengers. Even when carriers try to provide and replace covers after each passenger, significant waste results when service personnel are not able to distinguish between used covers and those that have not yet been utilized.

Efforts have gone as far as creating some type of recognition system to reduce such waste. See for example U.S. Pat. No. 4,253,701 issued to Kifferstain in which an arrangement in the cover sheet indicates whether it has been used such that a person intending to sit in the seat is informed whether the cover sheet is fresh or used, and the service personnel are able to identify the used cover sheets.

Thus it can be concluded, that the process of using any of the present headrest covers available is costly and time prohibitive for most carriers, especially when they have to be replaced with each leg of travel. This is therefore a long-felt, but unfulfilled need that the present invention efficiently will resolve.

In summary, a number of issues presently face carriers when using any of the currently available headrest covers and it becomes apparent that these issues are major deterrents to the consistent use of headrest covers. These issues include: the high cost to purchase; the cost to incorporate required engagement elements onto existing and new seats; the labor cost required to implement a one cover per passenger cycle; the cost of replacing all covers after each individual use; the cost of discarding fresh covers, not being able to distinguish the used from the new covers; the cost of shipping, laundering, storing and handling of reusable covers; the cost associated with potential delays to flight schedules contribute an unnecessary burden on industries already in distress.

The above harmful impact to the use frequency for headrest covers obliterates a cover's ultimate function; to protect individuals and communities from potential contamination. In addition to protection, the use of headrest covers provides the concerned public with a priceless added advantage; namely, user peace of mind. Once again in summary, all reusable and disposable replaceable headrest covers previously developed, suffer from a number of critical disadvantages that hinder the consistent use of said covers.

Research indicates that one convenient solution for such a critical, latent, and global dilemma would be to make available to applicable industries and the general public, an economical, replaceable, compact, disposable headrest cover that can be installed and removed easily and disposed of by the seat occupants themselves. If the travel community and general public have not yet publicly raised concerns, it is mainly because they are uninformed about some facts. In summary these facts include the following:

(a) Public seats seldom are properly cleaned and when they are, it is often only after months, if not years of continuous use.

(b) When individuals rest their heads on unprotected public seats they are rubbing their scalps against a surface that has been in contact with possibly hundreds of prior seat occupants with various degrees of cleanliness and health conditions.

(c) Every time individuals occupy a public seat without being adequately protected they can potentially become contaminated with a variety of skin conditions, parasitic caused illnesses and other contagious diseases.

(d) The human hand can be a major carrier (source) of viruses, germs, and bacteria. One common form of transmission of the flu and many other common illnesses is by contact with a surface that has been touched by an infected person. Rubbing ones' eyes, nose, or mouth after touching contaminated surfaces increases the possibility of becoming ill and of further spreading of germs. Again, most people use the headrest portion of seats as handle bars, especially in airplanes.

Becoming aware of these and other more specific consequences without the benefit of the present invention could cause public panic, disrupt communities, and even negatively impact the economy of a given sector. To minimize the potential for transmission of any virus, skin condition, or communicable diseases, the headrest cover should be used on a globally consistent basis. International carriers can be a major factor in the spread of a disease globally. Getting ill while aboard an airplane can be a serious matter. From the common cold to more serious infections, air passengers are more exposed to germs and viruses than ever before. High traffic surfaces harbor microorganisms that can contaminate a multitude of people. The present invention is designed not only to prevent possible soiling of the head-rest portion of the seat, but also the possibility of transmission of scalp, skin and other diseases from any prior user of the seat to others.

As some airlines literally struggle to survive, cost cutting has become a way of life for their industry. One of the first items eliminated with airline cutbacks were headrest covers. When still provided it can be assumed that it's primary intent is to protect the seat and/or to give the illusion that protection is being provided.

SUMMARY OF THE INVENTION

The present invention provides an improved, replaceable, easily attached seat headrest cover with integrated elastic means to secure the cover to a seat headrest without the need for special attachment tools or engagement elements permanently secured on to the seat surface. Accordingly, several additional advantages the present invention provides include: an improved headrest cover that is easily replaced and secured onto seats; a cover that is attached to seats independent of any special tools; a cover that is attached independent of any engagement mechanisms on the seats; a cover that is handled by the seat occupant; a versatile cover that is used on a multiplicity of modern and non-traditional airline seats with different headrest configurations, such as transportation vehicles and entertainment venues; a cover inexpensive enough to replace after each use; a cover that public carriers can efficiently make available to all passengers by placing covers in front seat pouches, along with sickness bags; a cover that public carriers can make available thru dispensers, vending machines (tissue roll or box type, etc.) or by selling them on request; a cover that can be used in other venues with shared public seating; a cover that can be commonly available and is purchased economically by the general public; a cover that is simple and inexpensive to manufacture; a cover that can be mass produced quickly, in response to a potential epidemic outbreak.

The present invention solves a long standing need that all prior efforts failed to adequately resolve, such as: the impact a cover's cost per unit has on its use; the need to make covers easy and quick to install and remove; the invasive effect covers have on seats, results in usage decline; the need to reduce the amount of handling by service personnel; the need to make covers available to individual seat occupants; the common need for covers in all public seating; the need to make covers widely available; and the need for making covers available in compact and convenient packaging.

An outstanding aspect of the present invention is that the general public will be provided with an alternative for protecting themselves from potential contamination without relying on commercial carriers, cinema theaters or others to do it for them.

BRIEF DESCRIPTION OF THE DRAWINGS

Various further and more specific objects, features, and advantages of the invention will appear from the description given below, taken in connection with the accompanying drawings, illustrating by way of example a number of preferred forms of the invention. Reference is here made to the drawings annexed hereto and forming an integral part of this specification, in which;

FIG. 1-A is a perspective front view of a seat showing the preferred embodiment for the headrest cover of the present invention.

FIG. 1-B is a perspective rear view of a seat showing the preferred embodiment for the headrest cover of the present invention.

FIG. 1-C is a perspective front view of the preferred embodiment for the headrest cover of the present invention as it would be handled by the user.

FIG. 1-D is a perspective plan view of the rear of the preferred embodiment for the headrest cover of the present invention showing its construction.

FIG. 1-E is a detailed cross-sectional view of a portion of the headrest cover shown in FIG. 1-D taken along line E' thereon.

FIG. 2-A is a perspective front view of a seat headrest showing the headrest cover in use on a modern non-traditional headrest configuration.

FIG. 2-B is a perspective front view of two adjoining seats showing the headrest cover on a modern non-traditional headrest configuration.

FIG. 2-C is a perspective front view of three adjoining seats showing the headrest cover on a wide headrest, business class configuration, or home theater seat.

FIG. 2-D is a perspective front view of seat showing the headrest cover on narrow headrest configuration; commuter aircraft, train, bus, ship, or theater.

FIG. 2-E is a perspective front view of cinema/theater seat showing the use of the headrest cover of the present invention.

FIG. 2-F is a perspective front view of an automobile seat showing the use of the headrest cover of the present invention.

FIG. 2-G is a perspective rear view of an automobile seat headrest showing the attachment of the headrest cover of the present invention.

FIG. 3-A is a perspective front view of the headrest cover showing the cover used as a pillow wrap.

FIG. 3-B is a further perspective front view of the headrest cover showing the cover used as a pillow wrap.

FIG. 3-C is a front view of the cover used as a bib/apron on a person.

FIG. 3-D is a perspective front view of the cover used as a face mask on a person.

FIG. 4-A is a perspective rear plan view of the multi-layered preferred embodiment of the headrest cover of the present invention shown in its multi-functional utility version.

FIG. 4-B is a perspective rear plan view of the multi-layered preferred embodiment of the headrest cover of the present invention shown in its multi-functional utility version, with handles.

FIG. 4-C is a perspective rear plan view of the multi-layered preferred embodiment of the headrest cover of the present invention shown in its multi-functional utility version, with gusset bottom and side edges and opening to operate as handle.

FIG. 4-D is a perspective view of the multi-layered preferred embodiment in its multi-functional utility version, used as a pillow casing.

FIG. 4-E is a perspective view of the multi-layered preferred embodiment in its multi-functional utility version, used as a storage-shopping bag.

FIG. 4-F is a perspective view of the multi-layered preferred embodiment in its multi-functional utility version, with gusset bottom and side edges and used as a trash collection container or sickness bag.

FIG. 5-A is a perspective front view of a seat showing the preferred embodiment in its multi-functional utility version, with pillow insert or inflatable compartment.

FIG. 5-B is a perspective front view of the preferred embodiment in its multi-functional utility version, with fold out extension to cover the backrest.

FIG. 5-C is a side view of a seat showing the preferred embodiment in its multi-functional utility version, with pillow insert or inflatable compartment used for head support.

FIG. 5-D is a perspective side view of the preferred embodiment in its multi-functional utility version, used as a sickness receptacle.

FIG. 6-A is a perspective view of an example of means to supply covers, in a roll dispensing form.

FIG. 6-B is a perspective view of an example of means to supply covers, in a tissue soft or hard pack dispensing form.

FIG. 6-C is a perspective view of an example of means to supply covers, individually and in multi-pack form.

FIG. 6-D is a perspective view of an example of means to supply covers, individually wrapped, pouched, or packed.

FIG. 7-A is a perspective front view of a seat showing an alternate preferred embodiment for the headrest cover of the present invention.

FIG. 7-B is a perspective rear view of a seat showing an alternate preferred embodiment for the headrest cover of the present invention.

FIG. 7-C is a perspective front view of an alternate preferred embodiment for the headrest cover showing the application of marketing indicia.

FIG. 7-D is a perspective rear plan view of an alternate preferred embodiment for the headrest cover of the present invention.

FIG. 8-A is a perspective front view of a seat showing a further alternate preferred embodiment for the headrest cover of the present invention.

FIG. 8-B is a perspective rear view of a seat showing a further alternate preferred embodiment for the headrest cover of the present invention.

FIG. 8-C is a perspective front view of a further alternate preferred embodiment for the headrest cover of the present invention.

FIG. 8-D is a perspective rear plan view of a further alternate preferred embodiment for the headrest cover of the present invention.

FIG. 9-A is a perspective front view of a seat showing an alternative embodiment of the headrest cover with elastic element that loops around the headrest.

FIG. 9-B is a perspective rear view of a seat showing an alternative embodiment of the headrest cover with elastic element that loops around headrest.

FIG. 9-C is a perspective front view of an alternative embodiment of the headrest cover with elastic element that loops around headrest.

FIG. 9-D is a perspective rear view of a seat showing an alternative embodiment of the headrest cover with cut-out framing around seat accessories.

FIG. 9-E is a perspective front view of an alternative embodiment of the headrest cover with a sliding clamp type attaching element and non elastic cord element.

FIG. 10-A is a perspective front view of a seat showing an alternative embodiment of the headrest cover.

FIG. 10-B is a perspective rear view of a seat showing an alternative embodiment of the headrest cover.

FIG. 10-C is a perspective front plan view of an alternative embodiment of the headrest cover.

FIG. 10-D is a perspective rear plan view of an alternative embodiment of the headrest cover.

FIG. 10-E is a perspective front view of a seat showing an alternative embodiment of the headrest cover.

FIG. 10-F is a perspective front view of a seat showing an alternative embodiment of the headrest cover.

FIG. 11-A is a front plan view of a preferred embodiment of the headrest cover of the present invention in position on a seat headrest showing the basic dimensional preferences for the structure of the cover.

FIG. 11-B is a side plan view of a preferred embodiment of the headrest cover of the present invention in position on a seat headrest showing the basic dimensional preferences for the structure of the cover.

REFERENCE NUMERALS IN THE DRAWINGS

The appended Drawing figures further disclose the details of the present invention and include reference numerals intended to be consistent throughout the figures. These references numerals refer to the following identified elements in each of the figures:

10 seat
12 seat backrest
14 seat headrest
16 headrest cover (single layer)
18 headrest cover (double layer)
20 cover sheet material
22 elastic elements
24a longer segment of the elastic element
24b shorter segment of the elastic element
26 end attachment area
28 intermediate attachment area
30 container/pillow case
32 container cut-out handle
34 container/pillow case opening
36 cut-out frame opening
38 advertising indicia
40 backrest cover extension
42 looping elastic element
44 cushion-pillow item
46 belt, cord, string element
48 sliding clamp
50 name-card slot
52 gusset edge
54 grab handle

DETAILED DESCRIPTION OF THE PREFERRED EMBODIMENTS

Within the context of this specification, each term or phrase below will include the following meaning or meanings:

Bonded or bonding refers to the joining, adhering, connecting, attaching, or the like, of two elements. Two elements will be considered bonded together when they are bonded directly to one another or indirectly to one another, such as when each is directly bonded to intermediate elements (an adhesive, for example).

Disposable includes being disposed of after use, and not intended to be washed or reused.

Elasticity or elastic include that property of a material by virtue of which it tends to substantially recover to its original size and shape after removal of a force causing deformation of the material.

Elongation includes the ratio of the extension of a material to the length of the material prior to extension. Elongation is expressed as a percentage.

Fabric refers to all woven, knitted, and non-woven materials (including for example paper & leather).

Front and rear are used to designate relationships relative to the seat or cover itself, rather than to suggest any position the cover assumes when it is positioned in use. The front of the cover is further defined as that side of the cover without the bonded elastic, while the rear is further defined as that side with the bonded elastic.

Side and end edges are used to designate the horizontal and vertical edges of the cover when in place over a seat headrest.

Non-woven means a material having a structure of individual fibers or threads which are interlaid, but not in an identifiable manner as in a knitted or woven fabric.

Non-woven composite means a laminate wherein some of the layers may be spunbond and some may be melt blown such as a spunbond/melt blown/spunbond (SMS) laminate and others as disclosed in U.S. Pat. Nos. 4,041,203; 5,169,706; 5,145,727; 5,178,931 and 5,188,885. Non-woven composites may also have various numbers of spunbond layers or various number of melt blown layers in many different configurations and may include other non-woven materials.

The present invention pertains to an improved replaceable seat headrest cover. The headrest cover sheet can be made of any flexible sheet like material, textile, woven, non-woven, cloth, film, paper, or leather (natural or imitation) that will provide a barrier between the surface of the seat or headrest and an occupant's head. The sheet can have a basis weight of between 10 and 200 gsm, more preferably between 30 and 80 gsm. The sheet can have a width of between 150 mm (6") and 900 mm (36"), more preferably between 200 mm (8") and 400 mm (16"). The sheet can have a length between 250 mm (10") and 900 mm (36"), more preferably between 400 mm (16") and 600 mm (24"). The sheet can be made of a single ply or multiple plies of similar or dissimilar material. More preferably the sheet would be made of a single or double ply of non-woven or non-woven composite.

The sheet will have thereto secured along both side edges (regions) or parallel to both side edges but at a distance of between 0 mm and 150 mm (6") from the side edges or more preferably between 0 mm and 100 mm (4") from the side edges, several relatively narrow elastic elements or more preferably two elastic bands, belts, strips, twines, loops, lines, strings or the likes, that in combination when used serve to secure the cover to the headrest portion of the seat. Alternately described, the cover sheet will have thereto secured parallel to both side edges, a minimum of two elastic elements at a distance of between 50 mm (2") and 250 mm (10") from the center of the sheet or more preferably between 75 mm (3") and 200 mm (8").

The elastic elements may be attached to the sheet by use of adhesive, heat seal, radio frequency (RF) or dielectric bonding, ultrasonic bonding, sewing, staples or any other attachment means known in the art for attaching elastic to a sheet. The elastics may be attached in a stretched and elongated state, but more preferably may be attached in an un-stretched or relaxed state. The elastic elements may be attached at the ends edges of the sheet and at multiple attachment points between the ends. Preferably each elastic element will be attached with at least two, three or four attachment points to the sheet.

The elastic elements may be bonded at opposing ends of the coversheet with a single additional bonding point between the opposing ends at a distance of between 125 mm (5") from one opposing end and 250 mm (10") from the same opposing end. More preferably the bonding point between the opposing ends would be between 175 mm (7") from one opposing end and 225 mm (9") from the same opposing end.

The elastic elements may be made of Lycra®, synthetic or natural rubber, elastic polymers, or fibers, woven or non-woven elastic materials, braided or knitted elastics, elastomeric, or any other elastic substance readily available. The elastic elements will have the capability of elongating at least 100% to 750% of their original relaxed length. Preferably the elastic elements will have the capability of elongating between 200% and 500% of their original relaxed length. In the present invention, the elastic elements will be at least one filament of at least one denier, or a tape/film of at least 0.001 mm thick. Preferably the elastic element will be between 0.005 mm and 0.050 mm thick and between 0.75 mm and 25 mm wide, or more preferably between 0.005 mm and 0.025 mm thick and between 3 mm (⅛") and 12 mm (½") wide.

Although the fabric used on the cover sheet may be described as any soft flexible material, it will of course be clearly understood by persons skilled in the art to which the invention pertains that other similar or equivalent fabrics and materials may also be used to manufacture the headrest cover of this invention like flannels, suede, silk, satins, velvet, mesh, canvas, nylon, lace, transparent plastics, velvet, vinyl, etc. For some applications, the cover may be formed from special fabrics and additives, such as; stain and dirt deterrent, watertight, flame resistant, fire retardant, recyclable, auto-degradable, hydrophilic, antibacterial, antifungal, antiviral and the like.

Although several specific embodiments of the invention are disclosed herein for purposes of explanation, further modifications or variations thereof, after study of this specification, will or may become apparent to those skilled in the art to which the invention pertains.

As shown in FIG. 1-A to FIG. 1-E of the drawings, a preferred embodiment of the invention is shown as a removable self-attaching, single layer, headrest cover 16, which includes cover sheet material 20 that is secured to the headrest 14 section of the backrest 12 portion of the seat 10, with two elastic elements 22 or their equivalent. The use of elastic elements 22 as a means of attachment allows for easy placement and removal of the headrest cover 16, without need for special tools, engagement elements, or adhesives. The integrated elastic elements 22 that run parallel or along the left and right side regions of the cover are attached by bonding the elastic elements 22 at the two end attachment areas 26 of the cover sheet and at least at one additional off-center attachment point 28 as shown. By providing the off-center attachment point 28, (see FIGS. 1-C & 1-D) two elastic segments of different lengths 24a & 24b are created (a long elastic segment 24a and a short elastic segment 24b) thereby the range of seat headrest configurations on which the cover can be use is significantly widened, by just inverting the cover and using the alternate length elastic segment.

In operation the single layer seat headrest cover 16 can be installed as shown in FIGS. 1-A & 1-B, by simply stretching the elastic elements 22 as shown in FIG. 1-C, sufficiently to clear the width of the seat headrest 14, setting the cover sheet material 20 in place over the headrest and releasing the elastic elements to secure the cover to the headrest as shown. FIG. 1-E shows in cross-sectional detail the manner in which the elastic elements 22 may be bonded to cover sheet material 20 at off-center point 28 (as an example). Similar bonding occurs at end attachment points 26.

The present invention in its preferred embodiment can provide multiple complementary functions in addition to a headrest cover's intended use, including but not limited to ones shown here. FIG. 2-A shows the versatility of the preferred embodiment of the single layer headrest cover 16 when used on modern non-traditional seat headrest configurations. This unconventional application of the cover takes place by vertically wrapping the elastic elements 22 around the protruding adjustable extensions of the seat headrest 14. FIG. 2-B shows the versatility of the preferred embodiment of the cover 16 when used on modern non-traditional business class seat headrest configurations. Such unconventional application of the cover takes place by vertically wrapping the elastic elements around the protruding headrest components as shown. FIG. 2-C shows the versatility of the preferred embodiment of the cover 16 when used on wide configuration business and first class seats, as well as home furniture and home theater seats. FIG. 2-D shows the versatility of the preferred embodiment of the cover 16 when used on narrow configuration seats, commonly used on older and commuter aircraft, trains, buses and ships and some theaters. FIG. 2-E shows the versatility of the preferred embodiment with unconventional application for the cover 16 to a cinema theater type seat.

FIGS. 2-F and 2-G are perspective views of an automobile seat with headrest 14 showing the use of the headrest cover 16 of the present invention. It can be seen that the manner of attachment in this case is similar in many respects to the attachment shown in conjunction with the seats of FIGS. 2-A and 2-B.

FIG. 3-A shows the versatility of the preferred embodiment for the cover 16 when used to wrap-around a pillow 44 wherein both elastic elements 22 engage the pillow. FIG. 3-B shows the versatility of the preferred embodiment in an unconventional application (a narrower pillow of the type often used in airlines) for the cover 16 to a pillow by wrapping the pillow with only one of the elastic elements 22.

FIG. 3-C shows the versatility of the preferred embodiment for the single layer cover 16 when used as a bib or apron to protect the wearer. FIG. 3-D further shows the versatility of the preferred embodiment for the cover 16 when used as a face mask.

Detailed Description of Alternate Preferred Embodiments

An additional preferred embodiment of the present invention is a multi-layer utility version, various designs of which are shown in FIGS. 4-A, 4-B and 4-C, as well as the manner in which they might be used in FIGS. 5-A through 5-D. This alternate preferred embodiment can provide additional and complementary functions including, but not limited to; a seat backrest cover, a pillowcase, a storage container, a shopping bag, a laundry bag, and a sickness receptacle.

FIG. 4-A shows this first alternative embodiment of the present invention in its basic utility form with a double layer headrest cover 18 that provides a container/pillow case 30 with opening 34. The double layer may be formed by any of a number of known methods including fusing, heat sealing, sewing, bonding, or otherwise attaching the layers around all but one side thereof. FIG. 4-B shows an alternative embodiment of the utility version in FIG. 4-A, with the addition of grab handles 54. FIG. 4-C shows an alternative embodiment of the utility version in FIG. 4-A with the addition of gusset edges 52 to expand capacity as a bag and the use of container cut-out handle 32 positioned as shown. FIG. 4-D shows this alternative embodiment of the present invention used as pillow casing. FIG. 4-E shows this alternative embodiment of the present invention used as carrying bag, with container cut-out handle 32 and an optional name card slot 50. FIG. 4-F shows this alternative embodiment with gusset edges 52 and used as waste bag.

FIG. 5-A shows the above described alternative embodiment used as headrest cover and head support with pillow insert (or inflatable pocket) 44. FIG. 5-B shows this alternative embodiment in a further configuration used as headrest and backrest cover, by folding out and extending a backrest cover extension 40 over the seat backrest 12. This feature may be used by separating the layers at the side edges and letting the front layer (no elastic) drape or extend down to cover backrest. It would also be possible to manufacture the double layer cover by bonding the edges of the two layers with a releasable or perforated bond. FIG. 5-C shows the alternative embodiment described above used as headrest cover and head support with pillow insert (or inflatable pocket compartment) 44 used for head support. FIG. 5-D shows the above described double layer alternative embodiment of the present invention used as sickness receptacle. For this alternative embodiment a liquid impermeable material and seals would be specified, providing a more appropriate and wider cavity than commonly available with such receptacles on most airlines.

FIG. 6-A is a perspective view of an example of one way to manufacture and supply the headrest covers of the present invention, in this instance in a roll dispensing form. This embodiment lends itself to the economical manufacture of the product on machinery that may progressively align the elastic elements 22 on cover sheet material 20 and bond the same at points 26 & 28 along the elastic elements. The roll of product thus formed may be cut or perforated (for later separation) into individual covers as shown.

FIG. 6-B is a perspective view of a further example of a manner in which to supply covers, in this instance stacked in a soft or hard pack dispensing form similar to a dispenser traditionally used to dispense tissues. FIG. 6-C is a perspective view of a further example of a means to supply covers, individually and in multi-pack form, in this case with each cover rolled into a compact configuration. FIG. 6-D is a perspective view of a further example of a means to supply covers, individually wrapped, pouched, or packed, in this case with each cover folded flat in a compact configuration.

A variety of further alternate preferred embodiments are shown in FIGS. 7-A to 7-D; 8-A to 8-D; 9-A to 9-E; and 10-A to 10-F. As shown in FIGS. 7-A to 7-D of the drawings, a further alternative basic embodiment of the invention is a headrest cover 16, with cover sheet material 20 with the elastic elements 22 shorter and extending only partially over cover sheet material 20 and bonded at least in two points 26 & 28. FIG. 7-C discloses a further optional feature (for this and all preferred embodiments of the present invention) wherein a logo or other advertising indicia 38 may be printed or otherwise placed on the cover sheet material 20.

As shown in FIGS. 8-A to 8-D of the drawings, a further alternative basic embodiment of the invention is a headrest cover 16, with a cover sheet material 20 with the elastic elements 22 bonded only at the end edges 26 of the cover.

FIGS. 9-A, 9-B & 9-C show a further alternative basic embodiment of the present invention in which one continuous elastic element 42 is used as the attaching means. In this alternate embodiment the elastic element 42 is adhered to cover sheet material 20 in a manner transverse to the material rather than parallel to the long edges of the material.

FIG. 9-D shows a further alternative embodiment with a cut-out frame opening 36 in headrest cover 16 to allow access to headrest accessories such as video monitors, phones, or the like. Such a modification could be made by either cutting a window out of cover sheet material 20 or by arranging additional lengths of elastic elements to connect with looping elastic element 42. FIG. 9-E shows an alternative embodiment with a non-elastic cord 46 and a sliding clamp type attaching element 48. This drawstring type embodiment would use the resiliency of the headrest cushion itself to help secure the cover 16.

FIG. 10-A shows a perspective front view of a further alternative embodiment of the cover 16 positioned on a seat headrest 14 with concave upper edges. In this embodiment the cover 16 incorporates a narrower upper edge to more closely fit the seat backrest 12 by following the contours of the headrest 14. FIG. 10-B shows a perspective rear view of this alternative embodiment of the cover 16 on a seat headrest 14 with concave upper edges as shown in FIG. 10-A. FIG. 10-C shows a perspective plan view of this alternative embodiment of the cover 16 for use on seat headrest 14 with concave upper edges as shown in FIG. 10-A. FIG. 10-D shows a perspective plan view of a slight modification of the above described alternative embodiment of the cover 16 for use on seat headrest 14 with similar concave upper edges on the headrest, again as shown in FIGS. 10-A and 10-B.

FIG. 10-E shows a perspective front view of a further alternative embodiment of the cover 16 in which the cover sheet material 20 may be widened and/or extended with backrest cover extension 40 to cover more seat area including the backrest 12 in a manner similar to that shown in FIG. 5-B. FIG. 10-F shows a perspective front view of a further alternative embodiment of the cover 16 in which the cover sheet material 20 wraps the entire upper part of the headrest 14 and one continuous elastic element 42 extends to encircle the headrest's horizontal perimeter.

Reference is finally made to FIGS. 11-A & 11-B for a brief description of the width (W), height (H), and depth (D) dimensions associated with the wide variety of seat headrests that headrest covers of the present invention may be used in conjunction with. The physical dimensions of the headrest cover of the present invention are selected so as to be appropriate for retention on the widest range of seats. As discussed above, the long segment/short segment structure of the elastic elements of the headrest cover is the primary factor in establishing this versatile application of a single sized cover. Alternate sized (and in some cases, alternate structured) headrest covers may be constructed that still incorporate the basic features of the present invention but increase or decrease the dimensions of the cover and the associated elastic elements as necessary.

In FIG. 11-A, width dimension W1 of the headrest provides the basis for determining the most appropriate width dimension W3 of the sheet portion of the headrest cover. As indicated above, the sheet can have a width of between 150 mm (6") and 900 mm (36"), more preferably between 200 mm (8") and 400 mm (16"). It is the width dimension W1 that helps determine the appropriate width dimension W3. Width dimension W2 is simply one half the difference between width dimension W1 and width dimension W3.

Height dimension H3 is simply the vertical extent of coverage of the headrest cover and is determined in part by the overall "length" of the cover. As indicated above the sheet can have a length between 250 mm (10") and 900 mm (36"), more preferably between 400 mm (16") and 600 mm (24"). A portion of this length (twice H1 plus D1, see FIG. 11-B) is related to the length of either the long elastic element 24a or the short elastic element 24b.

As described above, the sheet of the headrest cover will have an elastic element secured along each side edge area, generally parallel to the side edges but at a distance (width dimension W5 as seen in FIG. 11-A) of between 0 mm and 150 mm (6") from the side edges or more preferably between 0 mm and 100 mm (4") from the side edges. Alternately described, the cover sheet may have thereto secured parallel to both side edges, a minimum of two elastic elements at a distance (width dimension W4 as in FIG. 11-A) of between 50 mm (2") and 250 mm (10") from the center of the sheet or more preferably between 75 mm (3") and 200 mm (8"). The objective in any case is to provide a sufficient area of coverage to protect the head of the user with room for some movement (principally side to side) by the user. H1 is determined in part by the minimum distance from top of headrest to the elastic bonding point, so as to prevent the elastic from slipping upward and off of the headrest.

For the purpose of illustration most references made herein are to the first preferred embodiment except when noted, although many of the features described extend across all of the embodiments. The headrest cover may be used once or reused multiple times in any of the embodiments. The fastening means for this invention and its alternative embodiments are a significant improvement over existing headrest covers for travelers and those attending entertainment theaters. The headrest cover of the present invention is more affordable and easier to install, remove, reuse, replace, and dispose of than any existing commercially available headrest covers.

The ease of use and affordable characteristics of this invention would encourage individual seat occupants and travelers to use headrest covers on a more regular basis. The comprehensive and proper use of the present invention could drastically reduce the potential spread of human-borne bacteria and infectious diseases. The headrest cover of the present invention has a unique advantage in that it provides the general public and any specific community with an affordable, disposable, easy to use alternative for significantly shielding themselves from potential contamination and the spread of diseases. Airlines that choose to provide passengers with a utility embodiment of the present invention could benefit from multiple functions from a single item; head and/or backrest cover, pillowcase, carrying bag, sickness receptacle, trash container, bib, apron, wipe, face mask, and so on.

Although the descriptions above contain several specific uses, they should not be construed as limiting the scope of the invention, but are merely illustrations of some alternative embodiments and uses for the invention. The cover sheet and/or elastic element(s) can have dimensions that conform to specific seat forms such as business or first class travel seats, cinema theaters seats, dental chairs, automobile seats, school buses, etc. The cover sheet does not have to be rectangular as described but could be circular, oval, trapezoidal, triangular, etc. The cover sheet can be treated to be water repellant, water resistant, contain anti-microbial agents or micro-encapsulated fragrances, or any other treatment that would provide a benefit to the user. The covers can be customized to accommodate seat accessories, profiles, and configurations. The cover can also be made to include one of a number of different recognition type systems known in the art that identify for the user whether the cover has already been in use. Various other additional features may be incorporated into the cover of the present invention without departing from the spirit and scope of the invention.

I claim:

1. A cover for releasable securement onto the headrest portion of a seat or chair for engaging a seated person's head, the headrest portion of the seat or chair having a front, a top, and a back, the cover comprising:
    (a) a section of flexible sheet-like material having a front surface, a rear surface, a longitudinal dimension, first and second longitudinal lateral side regions generally parallel to the longitudinal dimension; and
    (b) first and second longitudinal elastic members, each of the elastic members having a length and a width, the width small relative to the length, each of the elastic members permanently attached in a longitudinal orientation to the sheet-like material in at least two points thereon, the length of each elastic member oriented parallel to the longitudinal dimension of the sheet-like material, the first elastic member attached within the first longitudinal lateral side region and the second elastic member attached within the second longitudinal lateral side region, the elastic members each having a loose portion between the points of attachment;

wherein the cover may be positioned over the headrest with the longitudinal dimension of the section of sheet-like material oriented up the front, over the top, and at least partially down the back of the headrest, and wherein the loose portion of each of the elastic members may be stretched in a direction away from their initial longitudinal orientation at least partially around the headrest to position the front surface of the sheet-like material in such a manner so as to receive on the front of the headrest the head of a person seated in the seat or chair.

2. The cover of claim 1 wherein the section of sheet-like material further comprises a top section bounded by the attached elastic members, and a front section not bounded by the attached elastic members, wherein the top section of the sheet-like material bounded by the attached elastic members may be positioned over the top of the headrest and the front section of the sheet-like material not bounded by the attachment of the elastic members may hang below the top section of the sheet-like material on the headrest to present a portion of the front surface of the sheet-like material to receive the head of the person seated in the seat or chair.

3. The cover of claim 1 wherein each of the elastic members is attached to the sheet-like material in at least three points thereon, each of the elastic members each having at least a first loose portion between points of attachment and a second loose portion between points of attachment; and the section of sheet-like material further comprises a top section bounded by the first loose portion of the attached elastic member, and a front section bounded by the second loose portion of the attached elastic members, wherein the top section of the sheet-like material may be positioned over the top of the headrest and the front section of the sheet-like material may hang below the top section of the sheet-like material on the headrest to present a portion of the front surface of the sheet-like material to receive the head of the person seated in the seat or chair.

4. The cover of claim 1 wherein the elastic members are attached to the sheet-like material by an adhesive bonding.

5. The cover of claim 1 wherein the elastic members are attached to the sheet-like material by sewing.

6. The cover of claim 1 wherein the elastic members are attached to the sheet-like material by heat bonding.

7. The cover of claim 1 wherein the section of flexible sheet-like material comprises a section of fabric.

8. The cover of claim 7 wherein the fabric comprises a woven material.

9. The cover of claim 7 wherein the fabric comprises paper material.

10. The cover of claim 7 wherein at least a portion of the fabric includes a hydrophobic material.

11. The cover of claim 7 wherein at least a portion of the fabric includes an antimicrobial compound.

12. The cover of claim 7 wherein at least a portion of the fabric comprises a gas permeable material.

13. The cover of claim 7 wherein the section of flexible sheet-like material comprises a first layer and a second layer of sheet-like material, the first layer adhered to the second layer at a portion of the perimeter edges thereof, the layers thereby forming a pocket, wherein the pocket thus formed by the layers of sheet-like material may receive and partially enclose an object.

14. The cover of claim 13 wherein the layers of flexible sheet-like material are sized and shaped to form a pocket suitable for receiving and partially enclosing a pillow.

15. The cover of claim 13 wherein the layers of flexible sheet-like material are sized and shaped to form a pocket suitable for receiving and carrying a plurality of personal items.

16. The cover of claim 15 wherein the layers of flexible sheet-like material comprise a handle structure positioned proximate to a portion of the perimeter edges of the sheet-like material wherein the layers are not adhered together.

* * * * *